Sept. 22, 1931.  C. C. FARMER  1,824,042
FLUID PRESSURE BRAKE
Filed Oct. 4, 1926
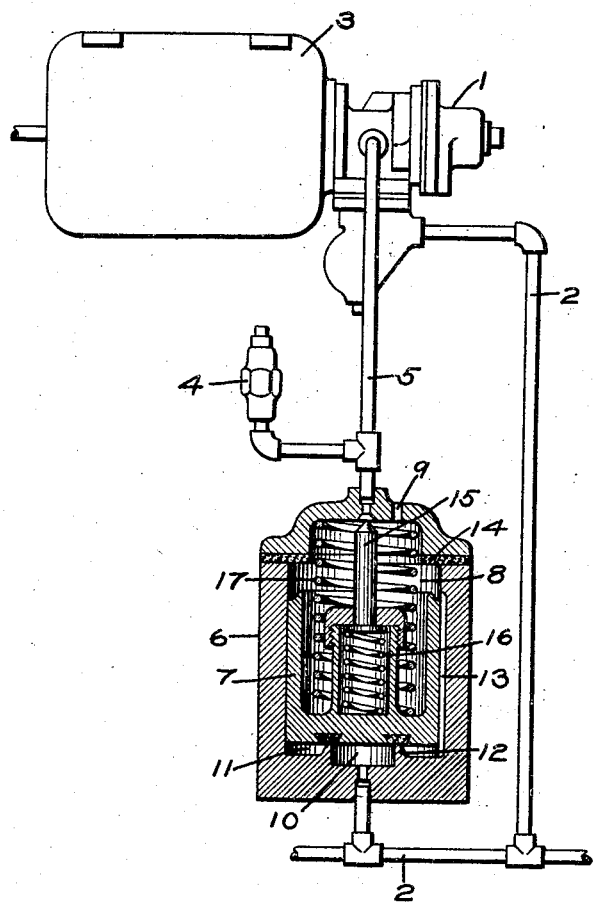
INVENTOR
CLYDE C. FARMER
BY Wm. M. Cady
ATTORNEY Patented Sept. 22, 1931

1,824,042

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed October 4, 1926. Serial No. 139,275.

This invention relates to fluid pressure brakes and more particularly to means for retaining fluid under pressure in the brake cylinder, in the operation of releasing the brakes.

In the running of railway trains, when descending grades, it is desirable to retain a certain degree of fluid pressure in the brake cylinder when the brake pipe pressure is increased to recharge the auxiliary reservoirs throughout the train.

The principal object of my invention is to provide means, under the control of the engineer, whereby the brake cylinder pressure retaining means may be cut in for grade service and cut out when the train is running on a level.

In the accompanying drawing, the single figure is a diagramatic view of a fluid pressure brake equipment, showing my invention applied thereto.

As shown in the drawing, the brake equipment may comprise a triple valve device 1, connected to the usual brake pipe 2, an auxiliary reservoir 3, a retaining valve device 4, connected to the triple valve brake cylinder exhaust pipe 5, and a control valve device 6.

The control valve device 6 may comprise a casing containing a valve piston 7, having at one side a chamber 8 connected to the atmosphere through a port 9. In its lower position, the valve piston 7 engages a seat ring 12, and the chamber 10, at the inner seated area, is in constant communication with the brake pipe 2, while chamber 11, at the outer seated area, is connected through a passage 13 with chamber 8.

When the valve piston 7 is in the opposite position to that shown in the drawing, or so that it seats against the gasket 14, chambers 10 and 11 are connected together and the upper end of the passage 13 is closed by the upper movement of the valve piston 7, so that fluid under pressure from the brake pipe 2 acts on the entire exposed lower surface of the valve piston 7.

Contained in chamber 8 and operative by the valve piston 7 is a secondary valve 15, adapted to control the connection between the brake cylinder exhaust pipe 5 and the atmosphere, by way of exhaust passage 9 from chamber 8. A coil spring 16 is contained in a chamber formed in the valve piston 7 and acts against the valve 15.

A spring 17, contained in chamber 8, acts on the valve 7 to hold said valve seated against the seat 12 so long as the usual brake pipe pressure is being employed.

In operation, the same brake pipe pressure may be carried in both level road service and grade service, such, for example, as 70 pounds.

When operating on a level road, the force of the spring 17 is such as to hold the valve piston 7 seated against the seat 12, so that the fluid at brake pipe pressure exerts its opposing force in chamber 10 only, the chamber 11 being connected to chamber 8 and thence to atmosphere through exhaust port 9.

With the valve piston 7 sealed against the seat 12, the connection between the triple valve exhaust pipe 5 and chamber 8 is opened by valve 15, so that when the triple valve device 1 is in release position, fluid from the brake cylinder may completely exhaust to atmosphere through pipe 5, chamber 8, and exhaust port 9 without retaining any pressure in the brake cylinder.

In order to adjust the apparatus for operation on a grade, the brake pipe pressure is increased to a degree above the normal pressure carried in the brake pipe, sufficient to cause the pressure in chamber 10 to overcome the opposing pressure of the spring 17. The valve piston 7 is then lifted from engagement with the seat ring 12, exposing the full area of the valve piston 7 to brake pipe pressure. The valve piston 7 is, thereupon, quickly shifted to its upper position, seating on the gasket 14 and cutting off communication from chamber 11, through passage 13 to chamber 8.

The movement of valve piston 7 to its upper position against gasket 14 causes the valve 15 to seat and to cut off communication between the triple valve exhaust pipe 5 and the exhaust port 9 to atmosphere.

Thus in grade service when recharging the auxiliary reservoir 3, with the triple valve device 1 in release position and after a service application of the brakes, fluid from the brake cylinder flows to the triple valve exhaust pipe 5, and can escape to the atmosphere, only through the retaining valve device 4.

The retaining valve device 4 may provide a slow blow down of fluid under pressure from the brake cylinder to some predetermined degree, such as 20 pounds, at which pressure said retaining valve device will automatically close and prevent a further decrease in brake cylinder pressure.

The retention of some predetermined degree of pressure in the brake cylinder will hold the brakes applied sufficiently to provide time for recharging of the auxiliary reservoir 3, after which another application of the brakes may be made.

To again adjust the brake equipment for operation in level road service, the brake pipe pressure is reduced to a degree less than the normal full service reduction, as for instance, a reduction of 30 pounds from the normal 70 pounds. At the lower brake pipe pressure, the pressure of spring 17 is sufficient to start the valve piston 7 moving towards its lower position against the seat 12. The initial downward movement of valve piston 7 opens the connection from passage 13 to chamber 8, thereby permitting fluid at brake pipe pressure in chamber 11 to suddenly decrease by flowing into chamber 8, wherein it supplements the force of spring 17 in quickly pushing the valve piston 7 to and against its seat 12. Chamber 11 is then connected to atmosphere through the passage 13 and the exhaust port 9.

The valve 15 is again opened by the downward movement of the valve piston 7, thus connecting the brake cylinder exhaust from pipe 5 to atmosphere, through the exhaust port 9, as is desired for level road service, as hereinbefore described.

It will be noted that the control valve device is so adjusted that when the valve piston 7 has once been shifted to its upper position, the brake pipe pressure may be reduced to the usual equalizing point in making a service application of the brakes without causing movement of the valve piston 7 to its lower seat and on the other hand, the brake pipe pressure must be increased a predetermined degree above the normal pressure carried before the valve piston 7 will be shifted from its lower seat.

Having now described my invention, what I claim as new and desire to secure by Letters Patent, is:—

1. In a fluid pressure brake, the combination with a brake cylinder and brake pipe, of a valve device comprising a valve for controlling communication from the brake cylinder to an atmospheric exhaust port, a piston for operating said valve having a seated position in which only a restricted area of said piston is exposed to brake pipe pressure, and a spring opposing brake pipe pressure on said piston, the outer seated area of said piston being connected to the atmosphere through a passage controlled by the movement of the piston.

2. In a fluid pressure brake, the combination with a brake cylinder, brake pipe, and triple valve device, of a pressure retaining valve device having an always open connection to the exhaust port of said triple valve device, and a valve device operated upon an increase in brake pipe pressure above the pressure normally carried in the brake pipe for cutting off communication from the brake cylinder to a direct exhaust port.

In testimony whereof I have hereunto set my hand.

CLYDE C. FARMER.